US012470740B2

(12) United States Patent
Budagavi et al.

(10) Patent No.: US 12,470,740 B2
(45) Date of Patent: Nov. 11, 2025

(54) VERTEX MOTION VECTOR CODING AND DECODING

(71) Applicant: SAMSUNG ELECTRONICS CO., LTD., Suwon-si (KR)

(72) Inventors: Madhukar Budagavi, Plano, TX (US); Rajan Laxman Joshi, San Diego, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 45 days.

(21) Appl. No.: 18/399,323

(22) Filed: Dec. 28, 2023

(65) Prior Publication Data

US 2024/0236358 A1    Jul. 11, 2024

Related U.S. Application Data

(60) Provisional application No. 63/462,136, filed on Apr. 26, 2023, provisional application No. 63/438,188, filed on Jan. 10, 2023.

(51) Int. Cl.
*H04N 19/513* (2014.01)
*H04N 19/597* (2014.01)
*H04N 19/70* (2014.01)

(52) U.S. Cl.
CPC ......... *H04N 19/513* (2014.11); *H04N 19/597* (2014.11); *H04N 19/70* (2014.11)

(58) Field of Classification Search
CPC ...... H04N 19/70; H04N 19/537; H04N 19/91; H04N 19/51

See application file for complete search history.

(56) References Cited

U.S. PATENT DOCUMENTS

| 9,264,706 | B2 | 2/2016 | Karczewicz et al. |
| 9,420,313 | B2 | 8/2016 | Lim et al. |
| 9,973,759 | B2 | 5/2018 | Zhang et al. |
| 2009/0219177 | A1* | 9/2009 | Le Lann ................ H04N 19/13 341/51 |

(Continued)

OTHER PUBLICATIONS

"V-Mesh Test Model v1" ISO/IEC JTC 1/SC 29/WG 7. MPEG 3D Graphics and Haptics Coding. Aug. 1, 2022.

(Continued)

*Primary Examiner* — Fabio S Lima
(74) *Attorney, Agent, or Firm* — BROADVIEW IP LAW, PC

(57) ABSTRACT

An apparatus comprises a communication interface configured to receive a compressed bitstream including a vertex motion vector information. The vertex motion vector information comprises one or more components. The apparatus comprises a processor operably coupled to the communication interface. The processor is configured to cause parsing the compressed bitstream including the vertex motion vector information, selecting contexts for a plurality of bins of a first component of the vertex motion vector information, wherein a first prefix bin of the first component is coded based on a first context, remaining prefix bins of the first component are coded based on a second context, and one or more suffix bins of the first component are coded using bypass coding, and decoding the first component of the vertex motion vector information based on the selected contexts.

17 Claims, 12 Drawing Sheets

(56) References Cited

U.S. PATENT DOCUMENTS

| | | | | |
|---|---|---|---|---|
| 2012/0300839 | A1* | 11/2012 | Sze | H04N 19/91 375/E7.243 |
| 2012/0328022 | A1* | 12/2012 | Sasai | H04N 19/70 375/240.16 |
| 2013/0129238 | A1* | 5/2013 | Sasai | H04N 19/91 382/233 |
| 2014/0140400 | A1* | 5/2014 | George | H04N 19/513 375/240.12 |
| 2016/0094852 | A1* | 3/2016 | Joshi | H04N 19/103 375/240.24 |
| 2020/0396489 | A1 | 12/2020 | Flynn et al. | |
| 2021/0084293 | A1 | 3/2021 | Sarwer et al. | |
| 2021/0227214 | A1 | 7/2021 | Liu et al. | |
| 2021/0392336 | A1 | 12/2021 | Tamse et al. | |
| 2022/0078428 | A1 | 3/2022 | Le Leannec et al. | |
| 2022/0164994 | A1 | 5/2022 | Joshi et al. | |
| 2024/0233192 | A1* | 7/2024 | Cao | G06T 9/001 |

OTHER PUBLICATIONS

International Search Report for PCT/KR2024/000288 by Korean Intellectual Property Office dated Apr. 8, 2024.

Choi, Yihyun et al. "Overview of the Video-based Dynamic Mesh Coding (V-DMC) Standard Work," 2022 13th International Conference on Information and Communication Technology Convergence (ICTC), Oct. 2022. doi: 10.1109/ICTC55196.2022.9952734.

Tang, Danhang et al. "Real-time compression and streaming of 4D performances," ACM Transactions on Graphics, vol. 37, Issue 6, Dec. 2018. doi: 10.1145/3272127.3275096.

Yang, Jeong-Hyu et al. "Compression of 3-D triangle mesh sequences based on vertex-wise motion vector prediction," IEEE Transactions on Circuits and Systems for Video Technology, vol. 12, Issue 12, Dec. 2002. doi: 10.1109/TCSVT.2002.806814.

* cited by examiner

| Symbol | Codeword | | | | | | | |
|---|---|---|---|---|---|---|---|---|
| 0  | 0 |   |   |   |   |   |   |   |
| 1  | 1 | 0 |   |   |   |   |   |   |
| 2  | 1 | 1 | 0 |   |   |   |   |   |
| 3  | 1 | 1 | 1 | 0 | 0 |   |   |   |
| 4  | 1 | 1 | 1 | 0 | 1 |   |   |   |
| 5  | 1 | 1 | 1 | 1 | 0 | 0 | 0 |   |
| 6  | 1 | 1 | 1 | 1 | 0 | 0 | 1 |   |
| 7  | 1 | 1 | 1 | 1 | 0 | 1 | 0 |   |
| 8  | 1 | 1 | 1 | 1 | 0 | 1 | 1 |   |
| 9  | 1 | 1 | 1 | 1 | 1 | 0 | 0 | 0 |
| 10 | 1 | 1 | 1 | 1 | 1 | 0 | 0 | 1 |
| 11 | 1 | 1 | 1 | 1 | 1 | 0 | 0 | 1 | 0 |
| 12 | 1 | 1 | 1 | 1 | 1 | 0 | 0 | 1 | 1 |
| 13 | 1 | 1 | 1 | 1 | 1 | 0 | 1 | 0 | 0 |
| 14 | 1 | 1 | 1 | 1 | 1 | 0 | 1 | 0 | 1 |
| 15 | 1 | 1 | 1 | 1 | 1 | 0 | 1 | 1 | 0 |
| 16 | 1 | 1 | 1 | 1 | 1 | 0 | 1 | 1 | 1 |

|   | C0 | C1 | C2 | C3 | C4 | C5 | C6 | C7 | C8 |
|---|----|----|----|----|----|----|----|----|----|
| X | 1  | 1  | 1  | 1  | 1  | 0  | 1  | 1  | 0  |

|   | C9 | C10 | C11 | C12 | C13 | C14 | C15 | C16 | C17 |
|---|----|-----|-----|-----|-----|-----|-----|-----|-----|
| Y | 1  | 1   | 1   | 1   | 1   | 0   | 0   | 1   | 1   |

|   | C18 | C19 | C20 | C21 | C22 | C23 | C24 | C25 | C26 |
|---|-----|-----|-----|-----|-----|-----|-----|-----|-----|
| Z | 1   | 1   | 1   | 1   | 1   | 0   | 0   | 0   | 0   |

|   | C0 | C1 | C2 | C3 | C4 | C5 | C6 | C7 | C8 |
|---|---|---|---|---|---|---|---|---|---|
| X | 1 | 1 | 1 | 1 | 1 | 0 | 1 | 1 | 0 |

|   | C9 | C10 | C2 | C3 | C4 | C5 | C6 | C7 | C8 |
|---|---|---|---|---|---|---|---|---|---|
| Y | 1 | 1 | 1 | 1 | 1 | 0 | 0 | 1 | 1 |

|   | C11 | C12 | C2 | C3 | C4 | C5 | C6 | C7 | C8 |
|---|---|---|---|---|---|---|---|---|---|
| Z | 1 | 1 | 1 | 1 | 1 | 0 | 0 | 0 | 0 |

|   | C0 | C1 | C2 | C3 | C3 | C3 | B | B | B |
|---|----|----|----|----|----|----|---|---|---|
| X | 1  | 1  | 1  | 1  | 1  | 0  | 1 | 1 | 0 |

|   | C4 | C5 | C2 | C3 | C3 | C3 | B | B | B |
|---|----|----|----|----|----|----|---|---|---|
| Y | 1  | 1  | 1  | 1  | 1  | 0  | 0 | 1 | 1 |

|   | C6 | C7 | C2 | C3 | C3 | C3 | B | B | B |
|---|----|----|----|----|----|----|---|---|---|
| Z | 1  | 1  | 1  | 1  | 1  | 0  | 0 | 0 | 0 |

810   820   830

VERTEX MOTION VECTOR CODING AND DECODING

CROSS-REFERENCE TO RELATED APPLICATIONS

This application claims the benefit of priority from U.S. Provisional Application No. 63/438,188, entitled "VERTEX 3D MOTION VECTOR CODING," filed Jan. 10, 2023; and U.S. Provisional Application No. 63/462,136, entitled "VERTEX 3D MOTION VECTOR CODING," filed Apr. 26, 2023, all of which are incorporated herein by reference in their entirety.

TECHNICAL FIELD

This disclosure generally relates to video coding and decoding, and more particularly to, for example, but not limited to, vertex motion vector coding and decoding for dynamic mesh.

BACKGROUND

Three hundred sixty-degree (360°) video and three-dimensional (3D) volumetric video are emerging as new ways of experiencing immersive content due to the ready availability of powerful handheld devices such as smartphones. While 360° video enables immersive "real life," "being there" experience for consumers by capturing the 360° outside-in view of the world, 3D volumetric video can provide complete 6 Degrees of Freedom (6DoF) experience of being and moving within the content. Users can interactively change their viewpoint and dynamically view any part of the captured scene or object they desire. Display and navigation sensors can track head movement of the user in real-time to determine the region of the 360° video or volumetric content that the user wants to view or interact with. Multimedia data that is 3D in nature, such as point clouds or 3D polygonal meshes, can be used in the immersive environment.

The description set forth in the background section should not be assumed to be prior art merely because it is set forth in the background section. The background section may describe aspects or embodiments of the present disclosure.

SUMMARY

One aspect of the present disclosure provides an apparatus comprising a communication interface configured to receive a compressed bitstream including a vertex motion vector information. The vertex motion vector information comprises one or more components. The apparatus includes a processor operably coupled to the communication interface. The processor is configured to cause parsing the compressed bitstream including the vertex motion vector information. The processor is configured to cause selecting contexts for a plurality of bins of a first component of the vertex motion vector information. A first prefix bin of the first component is coded based on a first context and one or more remaining bins of the first component are coded using bypass coding. The processor is configured to cause decoding the first component of the vertex motion vector information based on the selected contexts.

In some embodiments, remaining prefix bins of the first component are coded based on a second context.

In some embodiments, the processor is further configured to cause selecting contexts for a plurality of bins of one or more second components of the vertex motion vector information. First prefix bins of the one or more second components are coded based on the first context and one or more remaining bins of the one or more second components are coded using bypass coding. The processor is further configured to cause decoding the one or more second components of the vertex motion vector information based on the selected contexts.

In some embodiments, remaining prefix bins of the first component and the one or more second components are coded based on a second context.

In some embodiments, the first context is shared among the first prefix bins of the first component and the one or more second components, and the second context is shared among the remaining prefix bins of the first component and the one or more second components.

In some embodiments, the one or more components of the vertex motion vector information are binarized using a combination of unary code and exponential-Golomb code that comprises a prefix part and a suffix part.

In some embodiments, all of suffix bins of the first component and the one or more second components are coded using bypass coding.

One aspect of the present disclosure provides a method comprising receiving a compressed bitstream including a vertex motion vector information. The vertex motion vector information comprises one or more components. The method comprises parsing the compressed bitstream including the vertex motion vector information. The method comprises selecting contexts for a plurality of bins of a first component of the vertex motion vector information. A first prefix bin of the first component is coded based on a first context and one or more remaining bins of the first component are coded using bypass coding. The method comprises decoding the first component of the vertex motion vector information based on the selected contexts.

In some embodiments, remaining prefix bins of the first component are coded based on a second context.

In some embodiments, the method further comprises selecting contexts for a plurality of one or more second components of the vertex motion vector information. First prefix bins of the one or more second components are coded based on the first context, and one or more remaining bins of the one or more second components are coded using bypass coding. The method further comprises decoding the one or more second components of the vertex motion vector information based on the selected contexts.

In some embodiments, remaining prefix bins of the first component and the one or more second components are coded based on a second context.

In some embodiments, the first context is shared among the first prefix bins of the first component and the one or more second components, and the second context is shared among the remaining prefix bins of the first component and the one or more second components.

In some embodiments, the one or more components of the vertex motion vector information are binarized using a combination of unary code and exponential-Golomb code that comprises a prefix part and a suffix part.

One aspect of the present disclosure provides an apparatus comprising a communication interface and a processor operably coupled to the communication interface. The processor is configured to cause generating a vertex motion vector information including one or more components, encoding a first prefix bin of a first component of the vertex motion vector information based on a first context, encoding one or more remaining bins of the first component using bypass coding, forming a bitstream including an encoded vertex motion vector information, and transmitting the bitstream to a decoding apparatus via the communication interface.

In some embodiments, the processor is further configured to cause encoding remaining prefix bins of the first component based on a second context.

In some embodiments, the processor is further configured to cause encoding first prefix bins of one or more second components of the vertex motion vector information based on the first context and encoding one or more remaining bins of the one or more second components using bypass coding.

In some embodiments, the processor is further configured to cause encoding remaining prefix bins of the first component and the one or more second components based on a second context.

In some embodiments, the first context is shared among the first prefix bins of the first component and the one or more second components, and the second context is shared among the remaining prefix bins of the first component and the one or more second components.

In some embodiments, the one or more components of the vertex motion vector information are binarized using a combination of unary code and exponential-Golomb code that comprises a prefix part and a suffix part.

In some embodiments, all of suffix bins of the first component and the one or more components are coded using bypass coding.

BRIEF DESCRIPTION OF THE DRAWINGS

FIG. 8 illustrates an example set of contexts used for coding vertex motion vector information in accordance with an embodiment.

FIG. 9 illustrates an example of shared contexts among vertex motion vector information components in accordance with an embodiment.

FIG. 10 illustrates an example of shared contexts among vertex motion vector information components in accordance with an embodiment.

Figure 1:
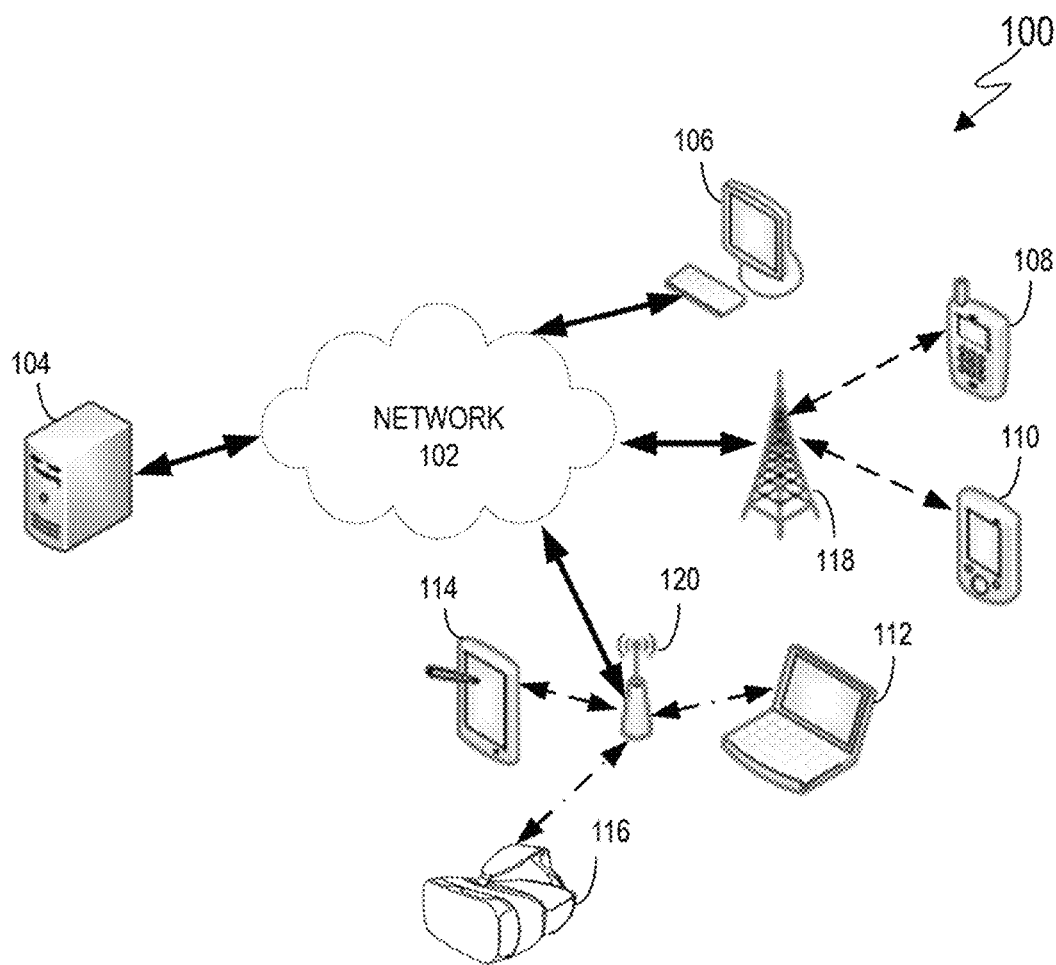
FIG. 1 illustrates an example communication system in accordance with an embodiment.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below, in connection with the appended drawings, is intended as a description of various implementations and is not intended to represent the only implementations in which the subject technology may be practiced. Rather, the detailed description includes specific details for the purpose of providing a thorough understanding of the inventive subject matter. As those skilled in the art would realize, the described implementations may be modified in various ways, all without departing from the scope of the present disclosure. Accordingly, the drawings and description are to be regarded as illustrative in nature and not restrictive. Like reference numerals designate like elements.

A point cloud is a set of 3D points along with attributes such as color, normal, reflectivity, point-size that represent an object's surface or volume. Point clouds are common in a variety of applications such as gaming, 3D maps, visualizations, medical applications, augmented reality, virtual reality, autonomous driving, multi-view replay, and 6DoF immersive media. Point clouds, if uncompressed, generally require a large amount of bandwidth for transmission. Due to the large bitrate requirement, point clouds are often compressed prior to transmission. To compress a 3D object such as a point cloud, specialized hardware is often required. To avoid specialized hardware to compress a 3D point cloud, a 3D point cloud can be transformed into traditional two-dimensional (2D) frames and that can be compressed and later be reconstructed and viewable to a user.

Polygonal 3D meshes, especially triangular meshes, are another popular format for representing 3D objects. Meshes typically consist of a set of vertices, edges, and faces that are used for representing the surface of 3D objects. Triangular meshes are simple polygonal meshes in which the faces are simple triangles covering the surface of the 3D object. Typically, there may be one or more attributes associated with the mesh. In one scenario, one or more attributes may be associated with each vertex in the mesh. For example, a texture attribute (RGB) may be associated with each vertex. In another scenario, each vertex may be associated with a pair of coordinates, (u, v). The (u, v) coordinates may point to a position in a texture map associated with the mesh. For example, the (u, v) coordinates may refer to row and column indices in the texture map, respectively. A mesh can be thought of as a point cloud with additional connectivity information.

The point cloud or meshes may be dynamic, i.e., they may vary with time. In these cases, the point cloud or mesh at a particular time instant may be referred to as a point cloud frame or a mesh frame, respectively.

Since point clouds and meshes contain a large amount of data, they require compression for efficient storage and transmission. This is particularly true for dynamic point clouds and meshes, which may contain 60 frames or higher per second.

The figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

FIG. 1 illustrates an example communication system 100 in accordance with an embodiment. The embodiment of the communication system 100 shown in FIG. 1 is for illustrative purposes only. Other embodiments of the communication system 100 can be used without departing from the scope of this disclosure.

The communication system 100 may include a network 102 that facilitates communication between various components in the communication system 100. For example, the network 102 can communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a TV, an interactive display, a wearable device, a head-mounted display (HMD), or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud or mesh, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display 360° scenes including one or more dynamic or static 3D point clouds. In certain embodiments, any of the client devices 106-116 can include an encoder, decoder, or both. For example, the mobile device 108 can record a 3D volumetric video and then encode the video enabling the video to be transmitted to one of the client devices 106-116. In another example, the laptop computer 112 can be used to generate a 3D point cloud or mesh, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud or mesh, generate a bitstream that represents the point cloud or mesh, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud or mesh, compress a 3D point cloud or mesh, transmit a 3D point cloud or mesh, receive a 3D point cloud or mesh, decode a 3D point cloud or mesh, render a 3D point cloud or mesh, or a combination thereof. For example, the server 104 can then compress 3D point cloud or mesh to generate a bitstream and then transmit the bitstream to one or more of the client devices 106-116. For another example, one of the client devices 106-116 can compress a 3D point cloud or mesh to generate a bitstream and then transmit the bitstream to another one of the client devices 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
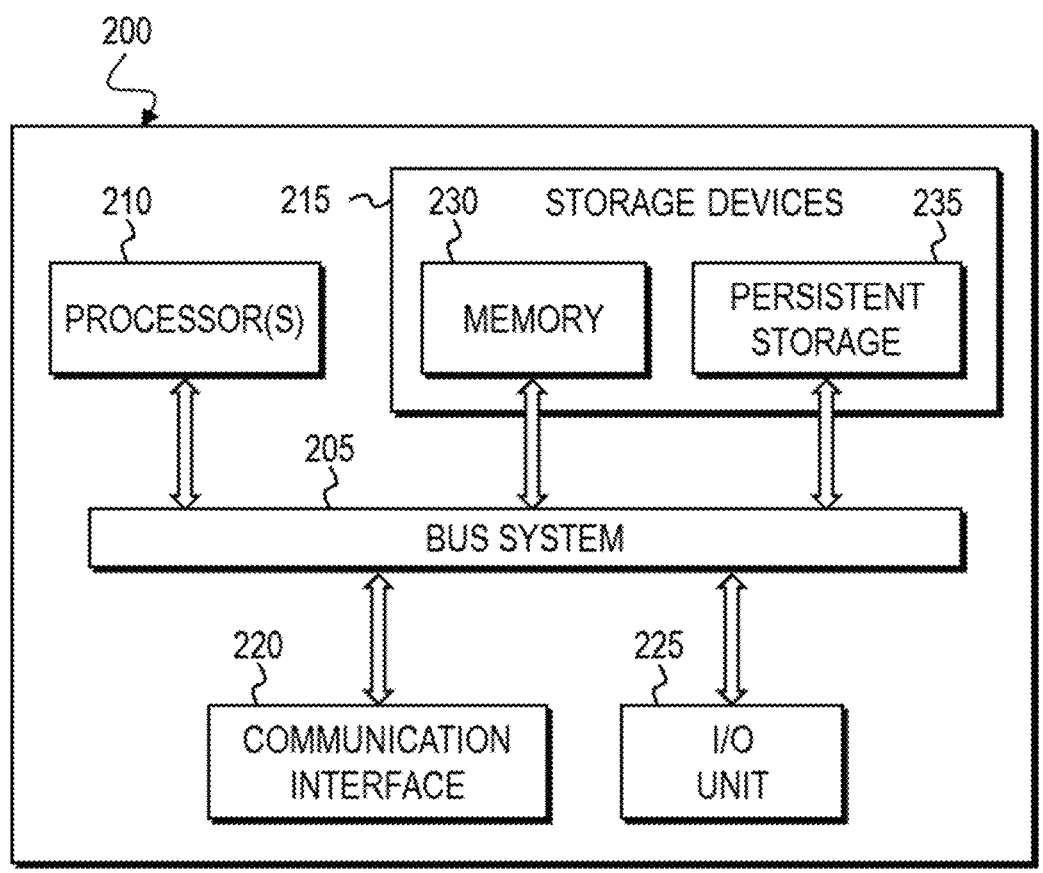
FIGS. 2 and 3 illustrate example electronic devices in accordance with an embodiment of this disclosure.
Figure 3:
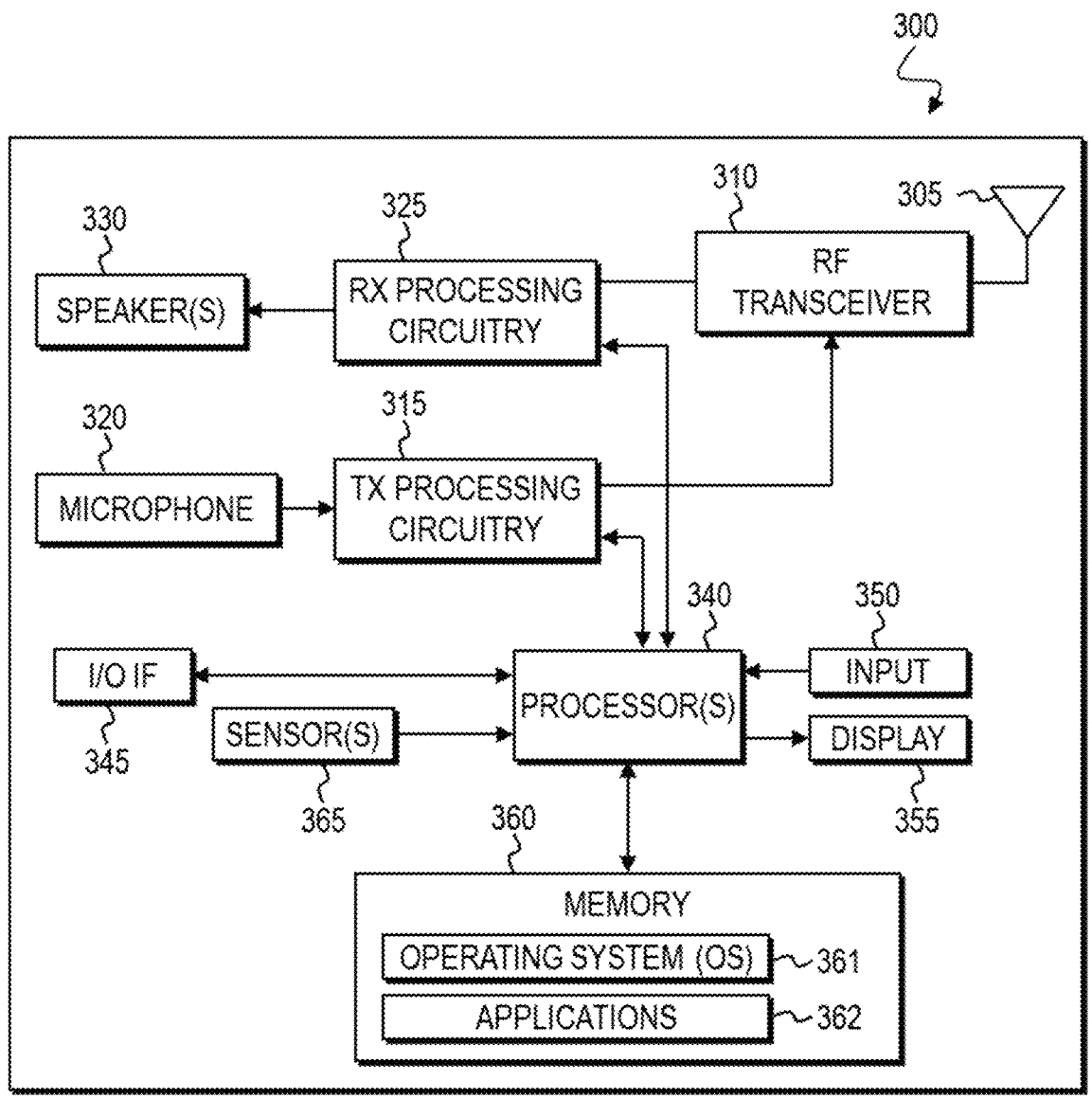

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

In certain embodiments, the processor 210 can encode a 3D point cloud or mesh stored within the storage devices 215. In certain embodiments, encoding a 3D point cloud also decodes the 3D point cloud or mesh to ensure that when the point cloud or mesh is reconstructed, the reconstructed 3D point cloud or mesh matches the 3D point cloud or mesh prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering the point cloud on an omnidirectional 360° scene, as viewed through a virtual reality (VR) headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106 116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content. In some embodiments, the processor 340 may utilize improved vertex motion vector encoding or decoding as described in this disclosure.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud or mesh.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, meshes, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as a virtual object or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Various standards have been proposed with respect to video-based compression of dynamic meshes. For example, the first vertex mesh test model (vmesh-v1.0) has been established in ISO/IEC SC29 WG07 in July 2022. The following document is hereby incorporated by reference in its entirety into the present disclosure as if fully set forth herein:

"V-Mesh Test Model v1, ISO/IEC SC29 WG07 N00404, July 2022"

Figure 4:
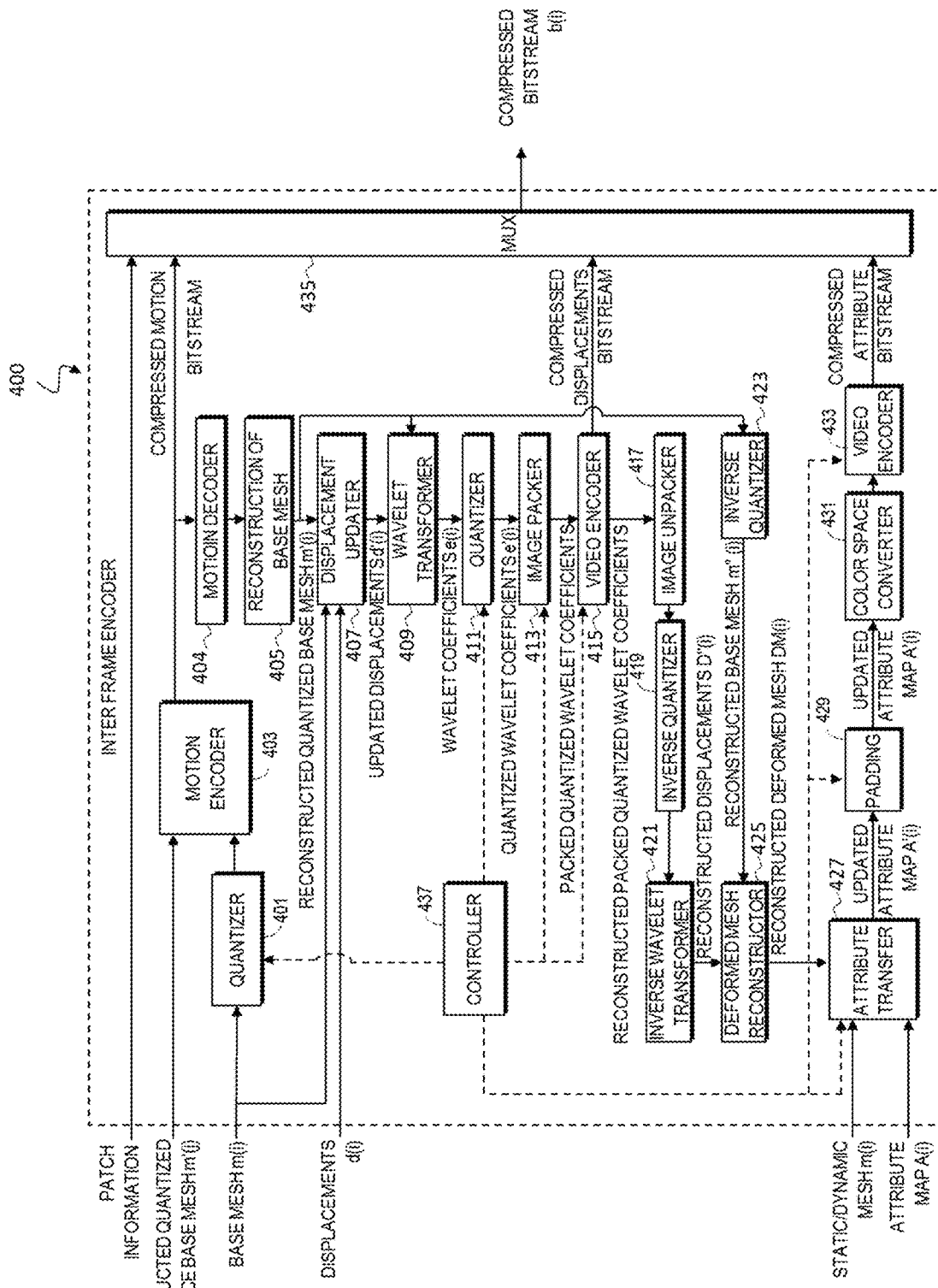
FIG. 4 illustrates an example block diagram for an inter-frame encoder in accordance with an embodiment.

FIG. 4 illustrates an example block diagram for an inter-frame encoder in accordance with an embodiment. The inter-frame encoder 400 shown in FIG. 4 is for illustrative purposes only. FIG. 4 does not limit the scope of this disclosure to any particular implementation of an inter-frame encoder and an inter-frame encoding process. The basic idea is that a base mesh, which typically has a smaller number of vertices, compared to the original mesh, is created and compressed either in a lossy or lossless manner. The reconstructed base mesh undergoes subdivision, and then a displacement field between the original mesh and the subdivided reconstructed based mesh is calculated. In inter-frame coding of mesh frame, the base mesh is coded by sending vertex motions instead of compressing the base mesh directly.

As shown in FIG. 4, the inter-frame encoder 400 may comprise a quantizer 401, a motion encoder 403, a motion decoder 404, a reconstruction of base mesh module 405, a displacements updater 407, a wavelet transformer 409, a quantizer 411, an image packer 413, a video encoder 415, an image unpacker 417, an inverse quantizer 419, an inverse wavelet transformer 421, an inverse quantizer 423, a deformed mesh reconstructor 425, an attribute transfer module 427, a padding module 429, a color space converter 431, a video encoder 433, a multiplexer 435, and a controller 437.

The quantizer 401 may quantize a base mesh m(i) to generate a quantized base mesh. The motion encoder 403 may encode the quantized base mesh to generate a compressed motion bitstream. The motion decoder 404 may decode the compressed motion bitstream to generate a reconstructed motion field, and the reconstruction of base mesh module 405 generates a quantized base mesh m'(i). The displacements updater 407 may update displacements d(i) based on the base mesh m(i) and the reconstructed quantized base mesh m'(i) to generate updated displacements d'(i). The reconstructed base mesh may undergo subdivision and then a displacement field between the original mesh and the subdivided reconstructed base mesh may be calculated.

The wavelet transformer 409 may perform a wavelet transform with the updated displacements d'(i) to generate wavelet coefficients e(i). The quantizer 411 may quantize the wavelet coefficients e(i) to generate quantized wavelet coefficients e'(i). The image packer 413 may pack the quantized wavelet coefficients e'(i) into a 2D image to generate packed quantized wavelet coefficients. The video encoder 415 may encode the packed quantized wavelet coefficients to generate a compressed displacements bitstream. The image unpacker 417 may unpack the packed quantized wavelet coefficients to generate unpacked quantized wavelet coefficients. The inverse quantizer 419 may inversely quantize the quantized wavelet coefficients to generate wavelet coefficients. In some embodiments, an alternate entropy coder, such as an arithmetic coding-based encoder, can also be used to code the quantized wavelet coefficients. The inverse wavelet transformer 421 may perform an inverse wavelet transform with the wavelet coefficients to generate reconstructed displacements D"(i). The inverse quantizer 423 may inversely quantize the reconstructed quantized base mesh m'(i) to generate a reconstructed base mesh m"(i). The deformed mesh reconstructor 425 may generate a reconstructed deformed mesh DM(i) based on the reconstructed displacements D"(i) and a reconstructed base mesh m"(i). The attribute transfer module 427 may update an attribute map A(i) based on a static/dynamic mesh m(i) and a reconstructed deformed mesh DM(i) to generate an updated attribute map A'(i). The attribute map may be a texture map but other attributes may be sent as well. The padding module 429 may perform padding to fill empty areas in the updated attribute map A'(i) so as to remove high frequency components. The color space converter 431 may perform a color space conversion of the padded updated attribute map A'(i). The video encoder 433 may encode the output of the color space converter 431 to generate the compressed attribute bitstream. The multiplexer 435 may multiplex header information (patch information), the compressed mesh bitstream, the compressed displacements bitstream, and the compressed attribute bitstream to generate a compressed bitstream b(i). The controller 437 may control modules of the encoder 400 including the quantizer 401 and 411, the image packer 413, video encoder 415, the attribute transfer module 427, the padding module 429, and the video encoder 433.

Figure 5:
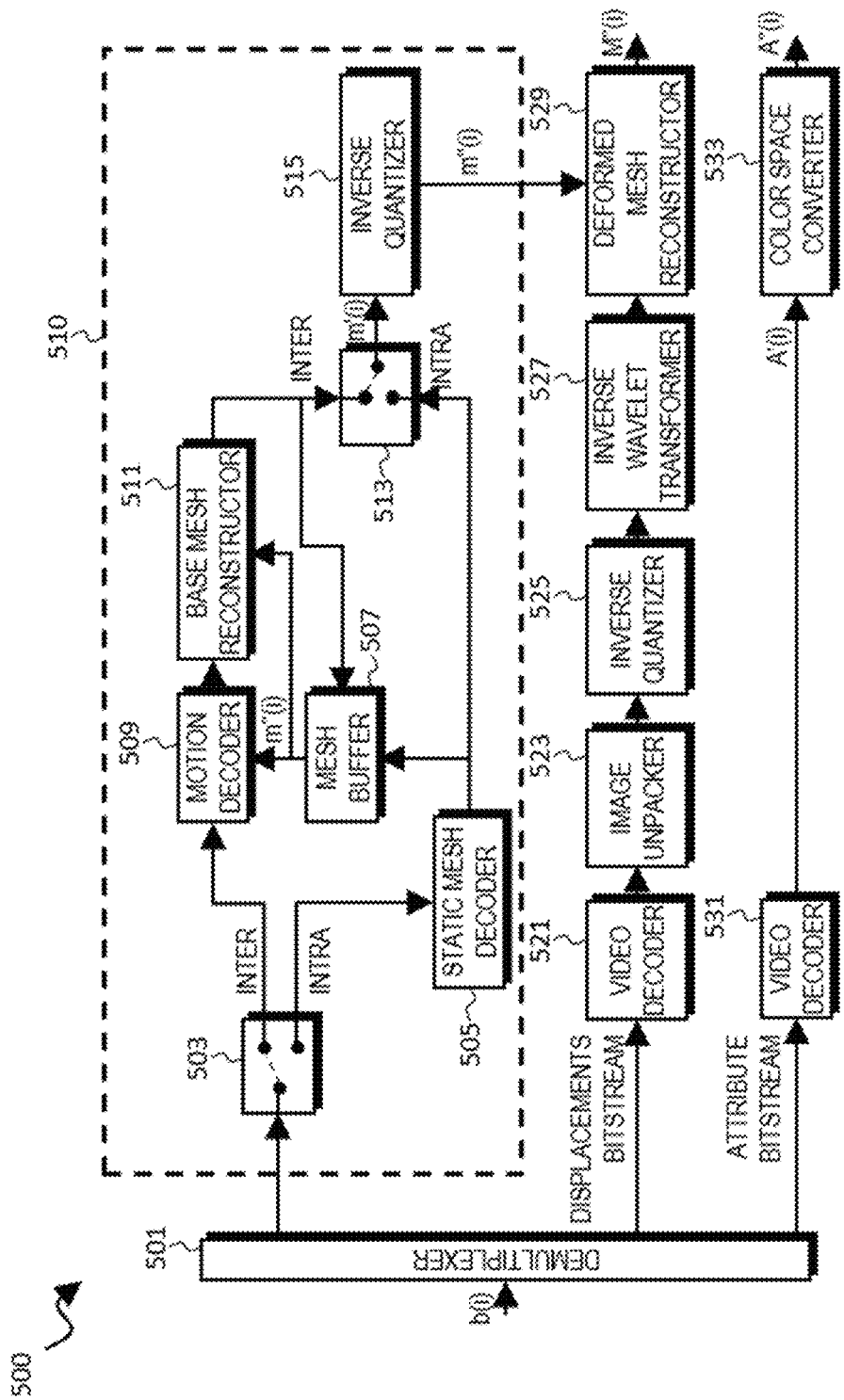
FIG. 5 illustrates an example block diagram for a decoder in accordance with an embodiment.

FIG. 5 illustrates an example block diagram for a decoder in accordance with an embodiment. The decoder 500 shown in FIG. 5 is for illustrative purposes only. FIG. 5 does not limit the scope of this disclosure to any particular implementation of a decoder and a decoding process.

As shown in FIG. 5, the decoder 500 may comprise a demultiplexer 501, a base mesh decoder 510, a video decoder 521, an image unpacker 523, an inverse quantizer 525, an inverse wavelet transformer 527, a deformed mesh reconstructor 529, a video decoder 531, and a color space converter 533. The base mesh decoder 510 may include a switch 503, a static mesh decoder 505, a mesh buffer 507, a motion decoder 509, a base mesh reconstructor 511, a switch 513, and an inverse quantizer 515.

The demultiplexer 501 may receive the compressed bitstream b(i) from the encoder 400 to extract the compressed motion bitstream, the compressed displacements bitstream, and the compressed attribute bitstream from the compressed bitstream b(i). The switch 503 may determine whether the compressed bitstream has an inter-coded mesh frame data or an intra-coded mesh frame data. If the compressed bitstream has the inter-coded mesh frame data, the switch 503 may transfer the inter-coded mesh frame data to the motion decoder 509. If the compressed base mesh bitstream has the intra-coded mesh frame data, the switch 503 may transfer the intra-coded mesh frame data to the static mesh decoder 505. The static mesh decoder 505 may decode the intra-coded mesh frame data to generate a reconstructed quantized base mesh frame. The mesh buffer 507 may store the reconstructed quantized base mesh frames and the inter-coded mesh frame data for future use of decoding subsequent inter-coded mesh frames. The reconstructed quantized base mesh frames may be used as reference mesh frames. The motion decoder 509 may obtain motion vectors for a current inter-coded mesh frame based on data stored in the mesh buffer 507 and syntax elements in the bitstream for the current inter-coded mesh frame. In some embodiments, the syntax elements in the bitstream for the current inter-coded mesh frame may be a motion vector difference. The base mesh reconstructor 511 may generate a reconstructed quantized base mesh frame by using syntax elements in the bitstream for the current inter-coded mesh frame based on the motion vectors for the current inter-coded mesh frame. The reconstructed quantized base mesh frame from the base mesh reconstructor 511 is stored in the mesh buffer 507. The switch 513 may transmit the reconstructed quantized base mesh frame from the static mesh decoder 505 to the inverse quantizer 515, if the compressed base mesh bitstream has the intra-coded mesh frame data. The switch 513 may transmit the reconstructed quantized base mesh frame from the base mesh reconstructor 511 to the inverse quantizer 515, if the compressed base mesh bitstream has the inter-coded mesh frame data. The inverse quantizer 515 may perform an inverse quantization with the reconstructed quantized base mesh frame to generate a reconstructed base mesh frame m"(i).

The video decoder 521 may decode a displacements bitstream to generate packed quantized wavelet coefficients. The image unpacker 523 may unpack the packed quantized wavelet coefficients to generate quantized wavelet coefficients. In some embodiments, an entropy decoder, such an arithmetic coding-based decoder, may decode the arithmetically-coded quantized wavelet coefficient. The inverse quantizer 525 may perform the inverse quantization with quantized wavelet coefficients to generate wavelet coefficients. The inverse wavelet transformer 527 may perform the inverse wavelet transform with wavelet coefficients to generate displacements. The deformed mesh reconstructor 529 may reconstruct a deformed mesh based on the displacements and the reconstructed base mesh frame m"(i). The video decoder 531 may decode the attribute bitstream to generate an attribute map before a color space conversion. The color space converter 533 may perform a color space conversion of the attribute map from the video decoder 531 to reconstruct the attribute map.

Figure 6:
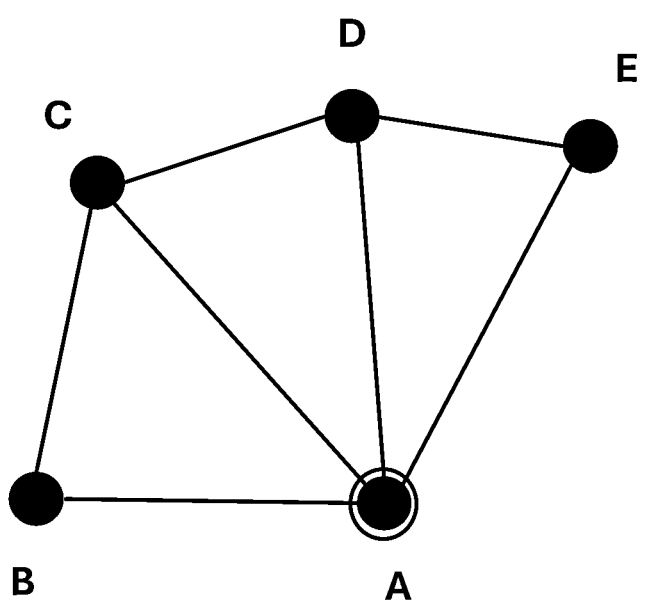
FIG. 6 illustrates an example set of vertices in accordance with an embodiment.

FIG. 6 illustrates an example set of vertices in accordance with an embodiment. The set of vertices shown in FIG. 6 is for illustrative purposes only and does not limit the scope of this disclosure to any particular implementation.

Referring to FIG. 6, the example set of vertices includes five vertices, such as vertex A, vertex B, vertex C, vertex D, and vertex E. When the inter frame prediction is enabled, for a given vertex A as shown in FIG. 6, a flag or other means may be used to indicate the vertex motion vector of A is transmitted or whether the delta difference between the vertex motion vector of A and its predicted value is transmitted. The predicted value of the vertex motion vector can be calculated, for example, as an average of the vertex motion vectors of neighboring vertices. In the example of FIG. 6, the predicted value of the vertex motion vector of A may be calculated as an average of the vertex motion vectors of neighboring vertices B, C, D, and E.

In this disclosure, the delta difference between vertex motion vector and its predicted value may be referred to as 'vertex motion vector difference', 'vertex motion vector residual', or 'vertex motion vector prediction residual.' For simplicity of explanation, the vertex motion vector, the vertex motion vector difference, the vertex motion vector residual, vertex motion vector prediction residual may be, collectively, referred to as 'vertex motion vector information' in this disclosure.

The vertex motion vector information, for example, vertex motion vector or the vertex motion vector difference, may be transmitted using a combination of unary code and exponential-Golomb code in arithmetic coding process. In some embodiments, the vertex motion vector information may be first binarized using a combination of unary code and exponential-Golomb code before performing arithmetic coding.

Figure 7:
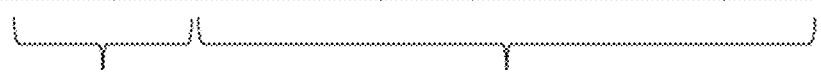
FIG. 7 illustrates an example set of codewords used for coding vertex motion vector information in accordance with an embodiment.

FIG. 7 shows an example set of codewords used for coding vertex motion vector information in accordance with an embodiment. The example set of codewords shown in FIG. 7 is for illustrative purposes only and does not limit the scope of this disclosure to any particular implementation.

In the example of FIG. 7, the vertex motion vector information is binarized using the combination of unary code and exponential-Golomb code. Referring to FIG. 7, the first and second columns 710 represent a unary code part, and the rest columns 720 represent an exponential-Golomb code part. In the example, the sign bit is coded separately. In an embodiment, a plurality of context memories are employed for bins (or bits) of a codeword. When context-based coding is used, the probability of a bin (or bit) taking a particular value can be predicted based on a probability model, which may be also referred to as a context model. Context for a bin may depend on values of related bins of previously coded syntax elements, such as motion vector difference.

FIG. 8 shows an example set of contexts used for coding vertex motion vector information in accordance with an embodiment. The example set of contexts shown in FIG. 8 is also for illustrative purposes only and does not limit the scope of this disclosure to any particular implementation.

In the example of FIG. 8, the vertex motion vector information includes three components (X=15, Y=12, and Z=9), which are parts of codewords depicted in FIG. 7. The first and second bins 810 in the codewords represent unary code part, while the third to sixth bins 820 represent prefix part of exponential-Golomb code. The seventh to ninth bins 830 represent suffix part of the exponential-Golomb code. In this example, each bin of the vertex motion vector information components (X=15, Y=12, and Z=9) is encoded using its dedicated context. Consequently, each component of the vertex motion vector information requires nine context memories. Specifically, component X uses contexts (C0-C8), component Y uses contexts (C9-C17), and component Z uses contexts (C18-C26). In total, 27 contexts (C0-C26) are used to encode all three components (X=15, Y=12, and Z=9) of the vertex motion vector information.

In some embodiments, some contexts may be shared among bins of the vertex motion vector information components as a means to reduce the number of context memories. The vertex motion vector information components are typically either all zero or predominantly non-zero. Therefore, there is correlation among X, Y, and Z components, which becomes evident in the most significant bins (e.g., prefix bins) of the components which have with a probability greater than 0.5. This can be exploited to improve compression efficiency by sharing the contexts among the most significant bins of X, Y, and Z components. On the other hand, the X, Y, Z components of one vertex motion vector information are typically not identical to the components in the adjacent motion vector information. So, there is usually less correlation among the least significant bins (e.g. the suffix bins) of the vertex motion vector information, and using context memory for such bins does not improve compression efficiency. Therefore, bypass coding, which has the benefit of reducing the amount of context memory, may be employed for the least significant bins.

FIG. 9 illustrates an example of shared contexts among vertex motion vector information components in accordance with an embodiment. This example shown in FIG. 9 is also for illustrative purposes only and does not limit the scope of this disclosure to any particular implementation.

In FIG. 9, three motion vector information components (X=15, Y=12, and Z=9) are depicted similarly to those in FIG. 8. In this example, contexts (C2-C8) are shared across the exponential-Golomb code part of the vertex motion vector information components. Specifically, the first and second bins 810, representing the unary part, are encoded using their own contexts (C0, C1, and C9-C12), while the remaining bins 820 and 830, representing the exponential-Golomb code part, share contexts (C2-C8) across the vertex motion vector information components. Therefore, context memories for C2-C8 can be shared among the exponential-Golomb code parts of the three motion vector information components.

In this example, the encoder 400 may use contexts (C0-C1, C9-C10, and C11-C12) to code unary code parts 810 of the vertex motion vector information components (X=15, Y=12, and Z=9). As for the exponential-Golomb code part 820 and 830, the encoder 400 may use context C2 to encode the third bins of the motion vector information components (X=15, Y=12, and Z=9). Similarly, the encoder 400 may use context C3 to encode the fourth bins, context C4 to encode the fifth bins, context C5 to encode the sixth bins, context C6 to encode the seventh bins, context C7 to encode the eighth bins, and context C8 to encode the ninth bins of the motion vector difference components. In total, 13 contexts (C0-C12)

are employed to encode the vertex motion vector information, reducing the number of contexts by 14 compared to the example of FIG. 8.

FIG. 10 illustrates an example of shared contexts among vertex motion vector information components in accordance with an embodiment. This example shown in FIG. 10 is also for illustrative purposes only and does not limit the scope of this disclosure to any particular implementation.

In FIG. 10, three motion vector differences components (X=15, Y=12, and Z=9) are depicted similarly to those in FIGS. 8 and 9 are depicted. The first and second bins 810 represent the unary code part, while the third to sixth bins 820 represent the prefix part of exponential-Golomb code, and the seventh to ninth bins 830 represent the suffix part of the exponential-Golomb code. In this example, the unary code part (i.e., the first and second bins) 810 are coded using their own contexts (C0-C1, C4-C5, and C6-7), the prefix part (i.e., the third to sixth bins) 820 are coded by sharing contexts (C2-C3) with prefix parts of the other motion vector information components, and the suffix part (i.e., the seventh to ninth bins) 830 are bypass coded. The bypass coding does not require context memory. In other words, context memories for C2-C3 are shared among the prefix parts of the vertex motion vector information components and the suffix parts of the vertex motion vector information components are bypass coded.

In the example described above, the encoder 400 may use contexts (C0-C1, C4-5, and C6-C7) to code unary code parts 810 of the vertex motion vector information components (X=15, Y=12, and Z=9). As for the prefix parts 820 of the exponential-Golomb code, the encoder 400 may use context C2 to code the first prefix bins (third bins in the codewords) of the vertex motion vector information components, context C3 to code the remaining prefix bins (fourth to sixth bins in the codewords). Then, the suffix bins (seventh to ninth bins in the codeword) 830 of the vertex motion vector information components are bypass coded. In this example, a total of 8 contexts (C0-C7) are employed to code the vertex motion vector information, reducing the number of contexts by 19 compared to the example of FIG. 8.

Table 1 shows example values of contexts for a coded syntax element in accordance with an embodiment. The coded syntax element may be a coded vertex motion vector information, such as a coded vertex motion vector difference. In some embodiments, the decoder 500 receives a compressed bitstream including the coded syntax element (e.g., coded vertex motion vector difference) and parses the compressed bitstream. In order to decode the code syntax element, the decoder 500 may select contexts for each bin of the coded syntax element based on the information on Table 1. The syntax element on Table 1 may be encoded by the encoder 400 according to the example of FIG. 10.

TABLE 1

| Syntax element | CtxTbl | CtxIdx | Count |
|---|---|---|---|
| sismu_mv_residual_abs_rem[k] | 5 | Prefix Bin 0 | 0 | 1 |
| | | Prefix Bin > 0 | 1 | 1 |
| | | Suffix | Bypass | 0 |

In Table 1, the syntax element 'sismu_mv_residual_abs_rem[k]' (k=0, 1, 2) represents the exponential-Golomb coded portion of vertex motion vector difference components. In some implementations, it may indicate the absolute value of the k-th component of a vertex motion vector prediction residual associated with the vertex with a sub-mesh.

'Contexts [ctxTbl][ctxIdx]' represent the table of contexts used for the coded syntax element. The values CtxTbl and CtxIdx may be determined based on the entries pertaining to the syntax element. The parameters 'ctxTbl' and 'ctxIdex' stand for context table and context index used for syntax elements, respectively. In the example of Table 1, the context used for 'sismu_mv_residual_abs[k]' may be stored, for instance, in ctxTbl=5.

In this example, Contexts[ctxTbl][0] (i.e., ctxIdx=0) contain the context information for the first bins of the prefix (i.e., first prefix bins) of sismu_mv_residual_abs_rem[k]' (k=0, 1, 2). Contexts[ctxTbl][1] (i.e. ctxIdx=1) contain the context information for the remaining bins of the prefix (i.e., remaining prefix bins) of sismu_mv_residual_abs_rem[k]. The suffix of sismu_mv_residual_abs_rem[k] is coded using bypass mode. Therefore, in each vertex motion vector difference component, the prefix first bin is coded using its own context, while the remaining prefix bins are coded using the same context. Additionally, the suffix bins are bypass coded and no context is used. As a result, only two (2) contexts are employed for the syntax element 'sismu_mv_residual_abs_rem [k]' (k=0, 1, 2) in Table 1.

In some implementations, the remaining bins of the prefix of sismu_mv_residual_abs_rem[k] may also be coded using bypass coding to further reduce the number of contexts.

In some implementations, a maximum of first n bins of the prefix part may be coded using their dedicated contexts, while the remaining bins of the prefix part (>n) may be coded using the same context and the suffix bins are coded using bypass coding.

Figure 11:
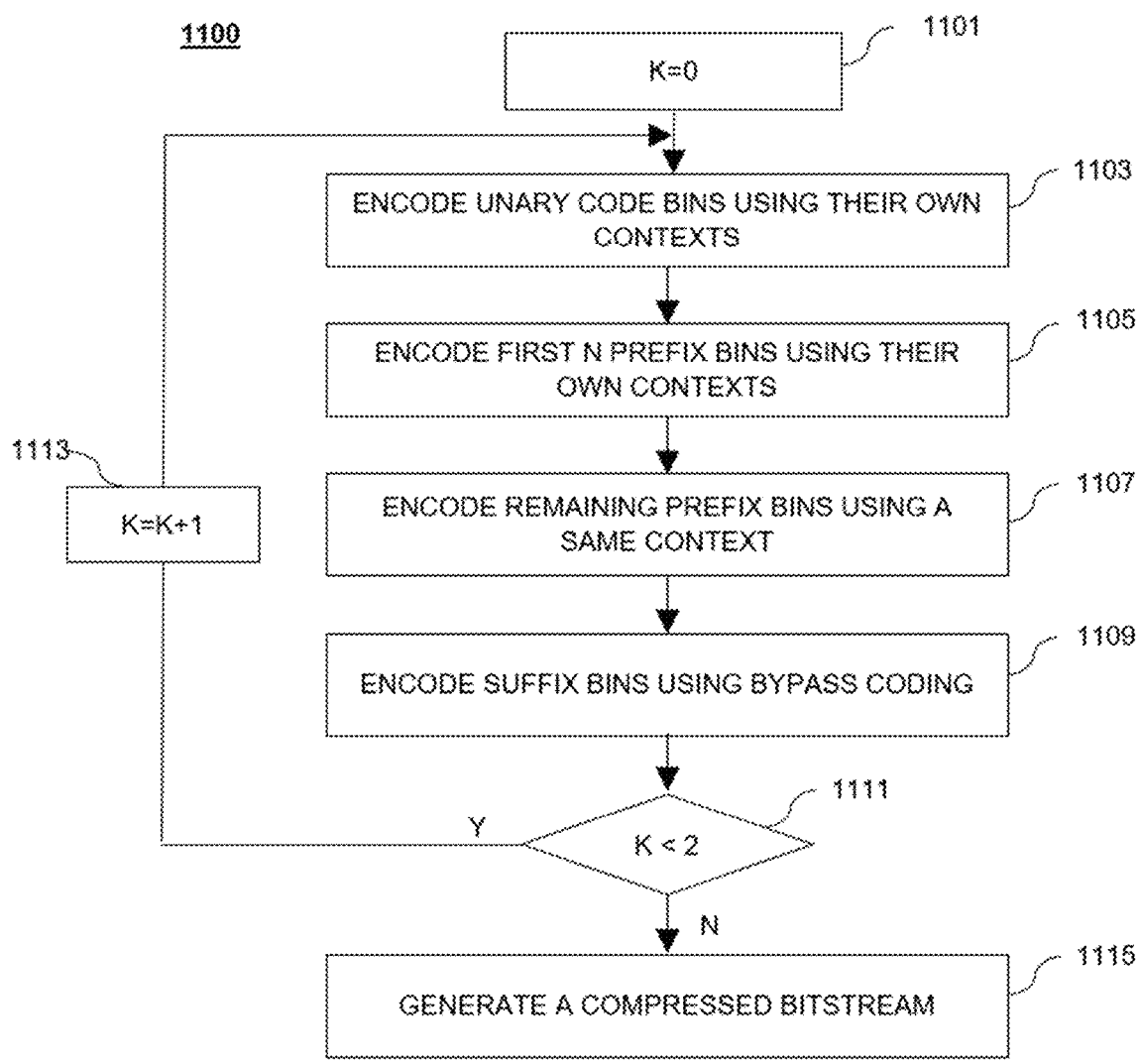
FIG. 11 illustrates a flow chart of an encoding process for a vertex motion vector difference in accordance with an embodiment.

FIG. 11 illustrates a flow chart of an encoding process 1100 for a vertex motion vector difference in accordance with an embodiment. Although one or more operations are described or shown in particular sequential order, in other embodiments the operations may be rearranged in a different order, which may include performance of multiple operations in at least partially overlapping time periods.

The process 1100 may begin in operation 1101. In operation 1101, the process 1100 binarizes the vertex motion vector difference, including three components (k=0, 1, 2), using a combination of unary code and exponential-Golomb code. Then, the process 1100 initiates encoding process from the first component (k=0) of the vertex motion vector difference.

In operation 1103, the process 1100 encodes the unary code bins of the vertex motion vector difference component (k=0) using their own contexts. Then, the process 1100 proceeds to operation 1105.

In operation 1105, the process 1100 encodes first prefix n bins of the exponential Golomb code of the vertex motion vector difference component (k=0) using their own contexts. In the example of FIG. 10, the first prefix bin of the exponential Golomb code of the motion vector difference component (k=0) is encoded using a first context (C2).

In operation 1107, the process 1100 encodes remaining prefix bins of the exponential Golomb code of the vertex motion vector difference component (k=0) using a same context. The same context is shared among all remaining prefix bins of the component (k=0). In the example of FIG. 10, remaining prefix bins of the component (k=0) are encoded using the same context C3. Then, the process proceeds to operation 1109.

In operation 1109, the process 1100 encodes the suffix of the exponential Golomb code of the vertex motion vector difference component (k=0) using bypass coding. In the example of FIG. 10, the suffix bins of the component (k=0)

are bypass coded. Therefore, no context memory is utilized. Then, the process 1100 proceeds to operation 1111.

In operation 1111, the process 1100 determines whether k is smaller than 2. When k is smaller than 2, the process 1100 proceeds to operation 1113.

In operation 1113, the process updates the value k. Then, the process 1100 repeats the operations 1103 to 1109 for the other vertex motion vector difference components (k=1, 2).

When the encoding process for all components (k=0, 1, 2) is completed, the process 1100 proceeds to operation 1115.

In operation 115, the process 1100 generates a compressed bitstream using the encoded motion vector difference including the code components (k=0, 1, 2)

In some implementations, all bins of the unary code part may be coded using different contexts without sharing contexts among other components, while contexts employed for the prefix bins may be shared among other components. In the example of FIG. 10, all first prefix bins of the vertex motion vector difference components (X, Y, Z) are encoded using a first context (C2). Additionally, all remaining prefix bins of the motion vector difference components (X, Y, Z) are encoded using a second context (C3).

Figure 12:
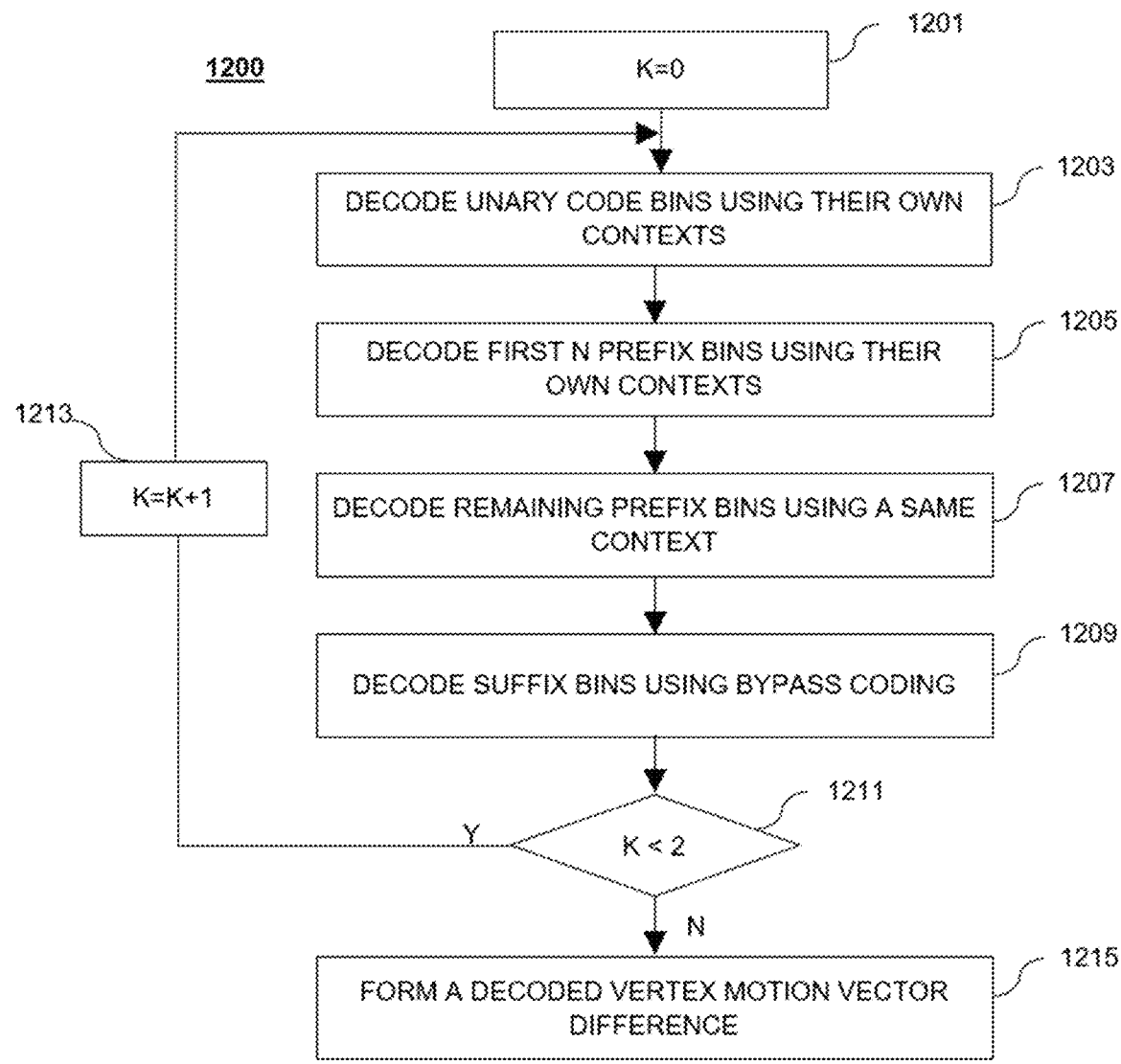
FIG. 12 illustrates a flow chart of a decoding process for a coded vertex motion vector difference in accordance with an embodiment.

FIG. 12 illustrates a flow chart of a decoding process 1200 for a coded vertex motion vector difference in accordance with an embodiment. Although one or more operations are described or shown in particular sequential order, in other embodiments the operations may be rearranged in a different order, which may include performance of multiple operations in at least partially overlapping time periods.

The process 1200 may begin in operation 1201. In operation 1201, the process 1200 receives a compressed bitstream and parses at least one portion of the compressed bitstream. The process 1200 identifies the coded vertex motion vector difference, including three components (k=0, 1, 2), from the received bitstream. Then, the process 1200 initiates decoding process from the first component (k=0) of the coded vertex motion vector difference.

In operation 1203, the process 1200 decodes the unary code bins of the vertex motion vector difference component (k=0) using their own contexts. The contexts are selected for each unary code bins of the coded vertex motion vector difference component (k=0). Then, the process 1200 proceeds to operation 1205.

In operation 1205, the process 1200 decodes first prefix n bins of the exponential Golomb code of the coded vertex motion vector difference component (k=0) using their own contexts. The contexts are selected for each of first prefix n bins of the coded motion vector difference component (k=0). Referring to the example of FIG. 10, the first prefix bin of the exponential Golomb code of the motion vector difference component (k=0) is encoded using a first context (C2). Then, the process 1200 proceeds to operation 1207.

In operation 1207, the process 1200 decodes remaining prefix bins of the exponential Golomb code of the vertex motion vector difference component (k=0) using a same context. The same context is shared among all remaining bins of the prefix of the component (k=0). The context is selected for all remaining prefix bins of the coded motion vector difference component (k=0). Referring to the example of FIG. 10, remaining bins of the exponential Golomb code of the component (k=0) are encoded using the same context C3. Then, the process 1200 proceeds to operation 1209.

In operation 1209, the process 1200 decodes the suffix of the exponential Golomb code of the coded vertex motion vector difference component (k=0). The suffix bins of the motion vector difference component (k=0) are bypass encoded. Therefore, contexts for the suffix bins are not required to be selected. In the example of FIG. 10, all suffix bins of the exponential Golomb code of the component (k=0) are bypass coded.

In operation 1211, the process 1200 determines whether k is smaller than 2. When k is smaller than 2, the process 1200 proceeds to operation 1213.

In operation 1213, the process 1200 updates the value k. Then, the process 1200 repeats the operations 1203 to 1209 for the other coded vertex motion vector difference components (k=1, 2).

When the decoding process for all components (k=0, 1, 2) is completed, the process proceeds to operation 1215.

In operation 1215, the process 1200 forms a decoded vertex motion vector difference including the code components (k=0, 1, 2)

In some implementations, all bins of the unary code part may be decoded using different contexts without sharing contexts among other components, while contexts selected for the prefix bins may be shared among other components.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term "include," "have," or the like is used, such term is intended to be inclusive in a manner similar to the term "comprise" as "comprise" is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus comprising:
   a communication interface configured to receive a compressed bitstream including a vertex motion vector information, the vertex motion vector information comprising one or more components; and
   a processor operably coupled to the communication interface, the processor configured to cause:
      parsing the compressed bitstream including the vertex motion vector information;
      selecting contexts for a plurality of bins of a first component of the vertex motion vector information, wherein a first prefix bin of the first component is coded based on a first context, wherein each remaining prefix bin of the plurality of bins of the first component is coded based on a second context, and one or more remaining bins of the first component are coded using bypass coding; and
      decoding the first component of the vertex motion vector information based on the selected contexts.

2. The apparatus of claim 1, wherein the processor is further configured to cause:
   selecting contexts for a plurality of bins of one or more second components of the vertex motion vector information, wherein first prefix bins of the one or more second components are coded based on the first context, and one or more remaining bins of the one or more second components are coded using bypass coding; and
   decoding the one or more second components of the vertex motion vector information based on the selected contexts.

3. The apparatus of claim 2, wherein remaining prefix bins of the first component and the one or more second components are coded based on the second context.

4. The apparatus of claim 3, wherein the first context is shared among the first prefix bins of the first component and the one or more second components, and the second context is shared among the remaining prefix bins of the first component and the one or more second components.

5. The apparatus of claim 1, wherein the one or more components of the vertex motion vector information are binarized using a combination of unary code and exponential-Golomb code that comprises a prefix part and a suffix part.

6. The apparatus of claim 2, wherein all of suffix bins of the first component and the one or more second components are coded using bypass coding.

7. A method comprising:
   receiving a compressed bitstream including a vertex motion vector information, the vertex motion vector information comprising one or more components;
   parsing the compressed bitstream including the vertex motion vector information;
   selecting contexts for a plurality of bins of a first component of the vertex motion vector information, wherein a first prefix bin of the first component is coded based on a first context, wherein each remaining prefix bin of the plurality of bins of the first component are coded based on a second context, and one or more remaining bins of the first component are coded using bypass coding; and
   decoding the first component of the vertex motion vector information based on the selected contexts.

8. The method of claim 7, wherein further comprising:
   selecting contexts for a plurality of one or more second components of the vertex motion vector information, wherein first prefix bins of the one or more second components are coded based on the first context, and one or more remaining bins of the one or more second components are coded using bypass coding; and decoding the one or more second components of the vertex motion vector information based on the selected contexts.

9. The method of claim 8, wherein remaining prefix bins of the first component and the one or more second components are coded based on the second context.

10. The method of claim 9, wherein the first context is shared among the first prefix bins of the first component and the one or more second components, and the second context is shared among the remaining prefix bins of the first component and the one or more second components.

11. The method of claim 7, wherein the one or more components of the vertex motion vector information are binarized using a combination of unary code and exponential-Golomb code that comprises a prefix part and a suffix part.

12. An apparatus comprising:
a communication interface;
a processor operably coupled to the communication interface, the processor configured to cause:
generating a vertex motion vector information including one or more components;
encoding a first prefix bin of a first component of the vertex motion vector information based on a first context;
encoding each remaining prefix bin of the plurality of bins of the first component based on a second context;
encoding one or more remaining bins of the first component using bypass coding;
forming a bitstream including an encoded vertex motion vector information; and
transmitting the bitstream to a decoding apparatus via the communication interface.

13. The apparatus of claim 12, wherein the processor is further configured to cause:
encoding first prefix bins of one or more second components of the vertex motion vector information based on the first context; and
encoding one or more remaining bins of the one or more second components using bypass coding.

14. The apparatus of claim 12, wherein the processor is further configured to cause encoding remaining prefix bins of the first component and the one or more second components based on the second context.

15. The apparatus of claim 14, wherein the first context is shared among the first prefix bins of the first component and the one or more second components, and the second context is shared among the remaining prefix bins of the first component and the one or more second components.

16. The apparatus of claim 12, wherein the one or more components of the vertex motion vector information are binarized using a combination of unary code and exponential-Golomb code that comprises a prefix part and a suffix part.

17. The apparatus of claim 13, wherein all of suffix bins of the first component and the one or more components are coded using bypass coding.

* * * * *